(12) United States Patent
Komatsu et al.

(10) Patent No.: US 6,773,847 B2
(45) Date of Patent: Aug. 10, 2004

(54) BATTERY

(75) Inventors: Shigeo Komatsu, Kyoto (JP); Yasushi Harada, Kyoto (JP); Masaaki Nishida, Kyoto (JP)

(73) Assignee: GS-Melcotec Co., Ltd., Kyoto (JP)

( * ) Notice: Subject to any disclaimer, the term of this patent is extended or adjusted under 35 U.S.C. 154(b) by 175 days.

(21) Appl. No.: 10/049,041

(22) PCT Filed: Jun. 1, 2001

(86) PCT No.: PCT/JP01/04652

§ 371 (c)(1), (2), (4) Date: Feb. 7, 2002

(87) PCT Pub. No.: WO01/95421

PCT Pub. Date: Dec. 13, 2001

(65) Prior Publication Data

US 2002/0146626 A1 Oct. 10, 2002

(30) Foreign Application Priority Data

Jun. 7, 2000 (JP) ........................................ 2000-169869
Jul. 6, 2000 (JP) ....................................... 2000-204857

(51) Int. Cl.⁷ ............................................... H01M 2/16
(52) U.S. Cl. .......................... 429/144; 429/251; 429/252
(58) Field of Search ................................ 429/144, 195, 429/251, 252

(56) References Cited

U.S. PATENT DOCUMENTS

| | | | | |
|---|---|---|---|---|
| 6,124,059 A | * | 9/2000 | Böhnstedt et al. | 429/252 |
| 6,183,901 B1 | * | 2/2001 | Ying et al. | 429/251 X |
| 6,287,720 B1 | * | 9/2001 | Yamashita et al. | 429/144 X |
| 6,497,780 B1 | * | 12/2002 | Carlson | 429/251 X |
| 6,537,334 B1 | * | 3/2003 | DuPasquier et al. | 429/251 X |

FOREIGN PATENT DOCUMENTS

| | | | | |
|---|---|---|---|---|
| EP | 814520 A2 | 12/1997 | | |
| JP | 10-106530 A | 4/1998 | | |
| JP | 10-172537 A | 6/1998 | | |
| JP | 11-315472 | * 11/1999 | ............ H01M/2/16 |
| JP | 2000-106167 A | 4/2000 | | |
| JP | 2000-149906 A | 5/2000 | | |
| JP | 2000-149997 A | 5/2000 | | |
| JP | 2001-6743 A | 1/2001 | | |

OTHER PUBLICATIONS

English translation of Japanese 2000–106,167. Kokai publication date Apr. 2000.*

* cited by examiner

Primary Examiner—Stephen J. Kalafut
(74) Attorney, Agent, or Firm—Sughrue Mion, PLLC

(57) ABSTRACT

A battery comprising a positive electrode (10), a negative electrode (20) and a separator (31) provided interposed between the positive electrode (10) and the negative electrode (20), characterized in that at least one surface of said separator (31) is bonded to said positive electrode (10) or negative electrode (20) via a porous resin layer (41, 33) containing a solid filler. This battery can provide a battery which exhibits a high energy density and an excellent cycle life performance even if the electricity-storing element is received in a flexible material case.

12 Claims, 7 Drawing Sheets

BATTERY

TECHNICAL FIELD

The present invention relates to a battery and particularly to a battery to be incorporated in small-sized electronic equipments.

BACKGROUND ART

In a battery having a metallic can as a container, it has been heretofore practiced to press the electrodes under a predetermined pressure and make the distance between the electrodes even. This is because that, when uniform distance between the electrodes along the surface of the electrodes is usual in that the electrode reaction proceeds uniformly all over the electrodes, expecting a prolonged life.

In recent years, a thin battery using a container of, e.g., a metal-resin laminate film rather than metallic can has appeared. This battery comprises an electricity-storing element made of a positive electrode, a separator and a negative electrode received in an airtight bag obtained by adhering a laminate film at the edges thereof.

However, since this type of a battery comprises, as a battery container, a container made of a flexible laminate film rather than a metallic can, the electrodes cannot be pressed by the pressure of the battery container. Thus, the distance between the electrodes is ununiform, causing a remarkable drop in the capacity during charge and discharge cycles.

Thus, Japanese Patent Application Laid-Open No. 1998-302843 proposes that the separator and the electrodes be bonded to each other with an adhesive. In accordance with this proposal, the distance between the electrodes can be kept constant even without any pressure of the battery container, causing the electrode reaction to proceed uniformly all over the electrodes and hence giving a prolonged life. As the adhesive used, ethylene glycol dimethacrylate, methyl methacrylate or the like is dissolved in N-methylpyrrolidone or the like.

However, when such an adhesive is used, a dense adhesive layer is formed on the surface of the electrodes. Accordingly, this layer of adhesive was disadvantageous in that it prevents the movement of the electrolyte across the space between the electrodes, causing an energy density drop.

It is therefore an object of the present invention to provide a battery which exhibits a high energy density and an excellent cycle life performance even if the electricity-storing element is received in a flexible material case.

DISCLOSURE OF THE INVENTION

The battery of the present invention is a battery comprising a positive electrode, a negative electrode and a separator provided interposed therebetween, wherein at least one surface of said separator is bonded to said positive electrode or negative electrode via a porous resin layer comprising a solid filler.

In the battery of the invention, since the electrode and the separator are bonded to each other with a porous resin layer as mentioned above, the distance between the electrodes can be kept constant even if the battery container is so flexible that the pressure of the battery container is not sufficient. Accordingly, even when subjected to repeated charges and discharges, the battery of the invention shows no capacity drop and thus exhibits a prolonged life.

Further, since the resin layer is made porous by the addition of a solid filler, the electrolyte can move across the space between the electrodes through the pores formed in the resin layer, enhancing the energy density.

The thickness of the resin layer is preferably from 1 $\mu$m to 10 $\mu$m. This is because the energy density of the battery can be enhanced when the thickness of the resin layer falls within this range. In other words, when the thickness of the resin layer falls below 1 $\mu$m, the adhesion between the electrode and the separator becomes insufficient. Therefore, it is likely that when the electricity-storing element is received in the battery container or the battery is in use, the distance between the electrodes can become ununiform, causing a capacity drop with the repetition of charge and discharge. On the contrary, when the thickness of the resin layer exceeds 10 $\mu$m, the distance between the electrodes becomes too long, causing an energy density drop.

The thickness of the separator is preferably not greater than 25 $\mu$m. This is because the energy density of the battery can be enhanced when the thickness of the separator falls within this range. In other words, when the thickness of the separator exceeds 25 $\mu$m, the distance between the electrodes becomes too large, causing an energy density drop.

The resin to be used in the resin layer is not specifically limited but preferably comprises at least one member selected from the group consisting of polyethylene, polypropylene, poly(vinylidene chloride), poly(vinylidene fluoride), poly(ethylene oxide) and polyacrylonitrile.

Alternatively, the resin to be used in the resin layer preferably comprises at least one member selected from the group consisting of copolymer of vinylidene fluoride and hexafluoropropylene, copolymer of vinylidene fluoride and chlorotrifluoroethylene, copolymer of vinylidene fluoride, hexafluoropropylene and tetrafluoroethylene, copolymer of vinylidene fluoride and tetrafluoroethylene and copolymer of hexafluoropropylene and tetrafluoroethylene.

The solid filler to be used in the resin layer preferably comprises a ceramic powder made of primary particles having an average diameter of from 5 to 100 nm.

This is because, when a resin solution containing a ceramic powder falling within this range is dried, the resin solution is adsorbed to the ceramic powder during drying. A lower amount of the resin solution exists less in the portion other than the portion having the ceramic powder present therein and thus forms pores when dried, rendering the resin layer porous. When the particle diameter of the ceramic powder exceeds 100 $\mu$m, the resin is adsorbed less to the ceramic powder, making it impossible to make the resin layer uniformly porous and hence causing a capacity drop and a resistance rise.

The ceramic powder is not specifically limited but preferably comprises at least one member selected from the group consisting of alumina, silica, titania and zirconia. This is because these materials are all excellent in resistance to organic electrolyte.

The specific surface area of the solid filler is preferably from not smaller than 50 $m^2$/g to not greater than 500 $m^2$/g. This is because when the specific surface area of the solid filler falls below 50 $m^2$/g, the resin is adsorbed less to the ceramic powder, making it impossible to make the resin layer uniformly porous and hence causing a capacity drop and increase of the resistance. This is also because when the specific surface area of the solid filler exceeds 500 $m^2$/g, the amount of a solvent to be adsorbed to the ceramic powder increases during the preparation of a paste of the resin, the ceramic powder and the solvent, making it difficult to form a uniform resin layer and hence lowering the adhesion strength, which deteriorates the cycle life performance.

A part of the resin layer preferably penetrates into the surface layer of the positive electrode and negative electrode. This is because, when a part of the resin layer penetrates into the surface layer of the positive electrode and negative electrode, the separator can be firmly bonded to the positive electrode and negative electrode to keep the distance between the electrodes constant. Thus, when subjected to repeated charges and discharges, the battery undergoes no capacity drop and hence exhibits a prolonged life.

The battery of the invention may be applied to any type such as cylindrical battery, prismatic battery, sheet-shaped battery, laminated battery, coin-shaped battery and pin-shaped battery. The shape of the battery of the invention is not specifically limited, but the positive electrode, the negative electrode and the separator are preferably received in a flexible material case. The distance between the electrodes can be difficultly kept constant particularly when the battery container is flexible. Even in such a case, the present invention makes it possible to keep the distance between the electrodes constant, causing no capacity drop and hence giving a prolonged life.

The battery of the present invention can be widely used regardless of which it is of primary type or secondary type.

BEST MODE FOR CARRYING OUT THE INVENTION

Preferred embodiment of the present invention will be described in further detail.

In order to confirm the effect of the present invention, a lithium ion battery having the following specification was prepared. The electricity-storing element of this battery comprises a positive electrode, a separator, a negative electrode and a separator.

Figure 1:
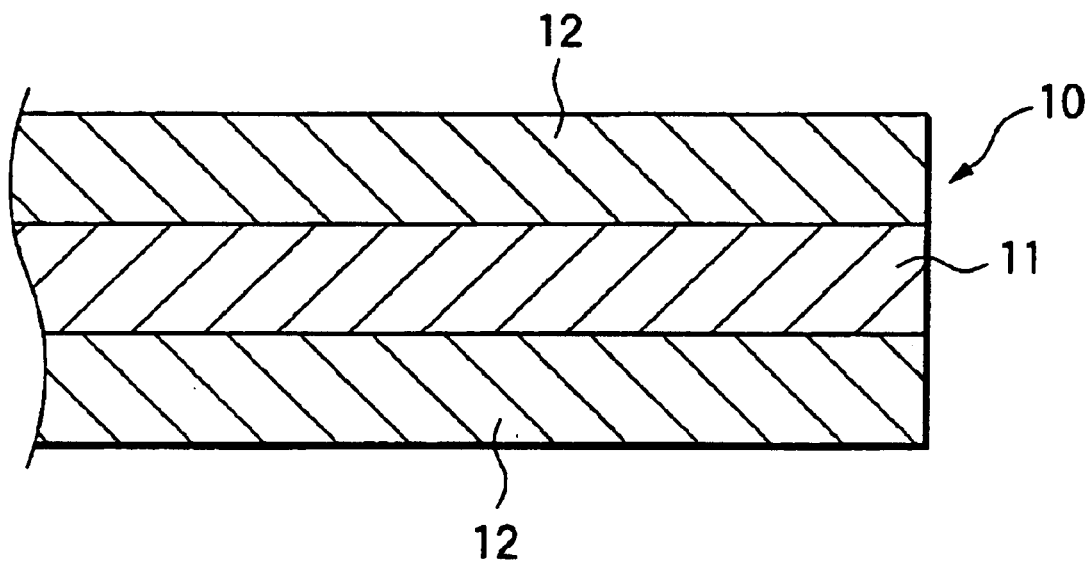
FIG. 1 is an enlarged sectional view of one embodiment of the positive electrode of the present invention.

The positive electrode 10 comprised a positive composite 12 retained on both sides of a current collector 11 made of an aluminum foil having a thickness of 20 $\mu$m as shown in FIG. 1. The positive composite 12 was prepared by mixing 91 parts of a lithium cobalt composite oxide $LiCoO_2$ as a positive active material, 6 parts of a poly(vinylidene fluoride) as a binder and 3 parts of acetylene black as an electrically conducting material to make a paste. The composite 12 was spread to both sides of the current collector 11, dried, and then rolled to prepare the positive electrode 10. The positive electrode 10 was then cut to a predetermined width. Thus, the positive electrode 10 was then used in the form of belt.

Figure 2:
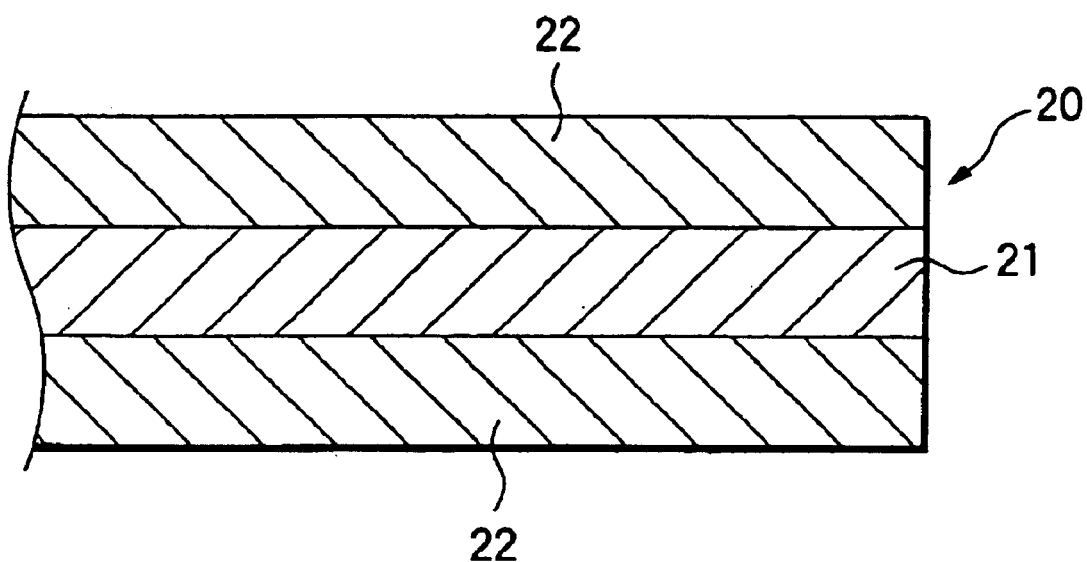
FIG. 2 is an enlarged sectional view of one embodiment of the negative electrode of the present invention.

On the other hand, as shown in FIG. 2, the negative electrode 20 comprised a negative composite 22 retained on both sides of a current collector 21 made of a copper foil having a thickness of 10 $\mu$m. The negative composite 22 was prepared by mixing 92 parts of a graphite powder having a specific surface area of 1 $m^2/g$ as a negative active material and 8 parts of a poly(vinylidene fluoride) as a binder, and then properly adding N-methyl-2-pyrrolidone to the mixture to make a paste. The composite 22 was applied to both sides of the current collector 21, dried, and then rolled to prepare the negative electrode 20. The negative electrode 20 was then cut to a predetermined width, and used in the form of belt.

As the separator, a porous polyethylene sheet having a porosity of 45% was provided interposed between the electrodes. The thickness of the separator was varied from 15 to 25 $\mu$m as set forth in Table 1 shown later.

As the resin layer, a copolymer of vinylidene fluoride and hexafluoropropylene was previously emulsion-polymerized. The emulsion of copolymer was dehydrated to a powder, which was then dissolved in N-methyl-2-pyrrolidone. To the solution was then added to an alumina powder to prepare a sticky paste. An alumina powder having a primary particle diameter of from 10 to 20 nm and a specific surface area of 100±15 $m^2/g$ (the BET method) was used. The sticky paste used comprised the copolymer and the alumina powder at a mixing ratio of 1:1 by dry weight.

Figure 3:
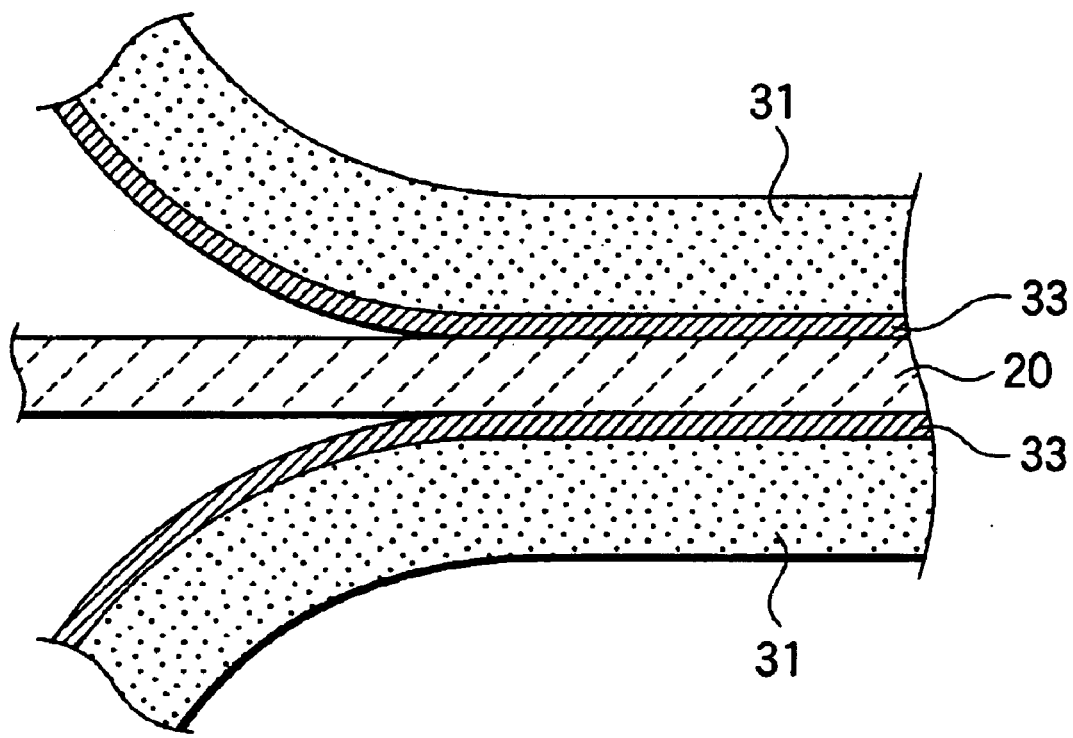
FIG. 3 is an enlarged sectional view illustrating one embodiment of the present invention wherein a separator is bonded to the negative electrode of the present invention.

Subsequently, as shown in FIG. 3, the mixture was applied to one side of a separator 31 to form a resin layer 33. Two sheets of the separator 31 having the resin layer 33 formed thereon were prepared and bonded to the respective side of the negative electrode 20 before the resin layer 33 was dried. The bonding was carried out such that the resin layer 33 of the separator 31 was opposed to the negative electrode 20.

Figure 4:
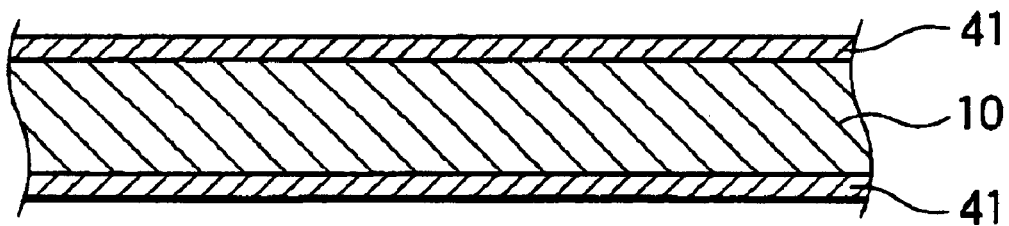
FIG. 4 is an enlarged sectional view illustrating one embodiment of the present invention wherein a resin layer is formed on the positive electrode.
Figure 5:
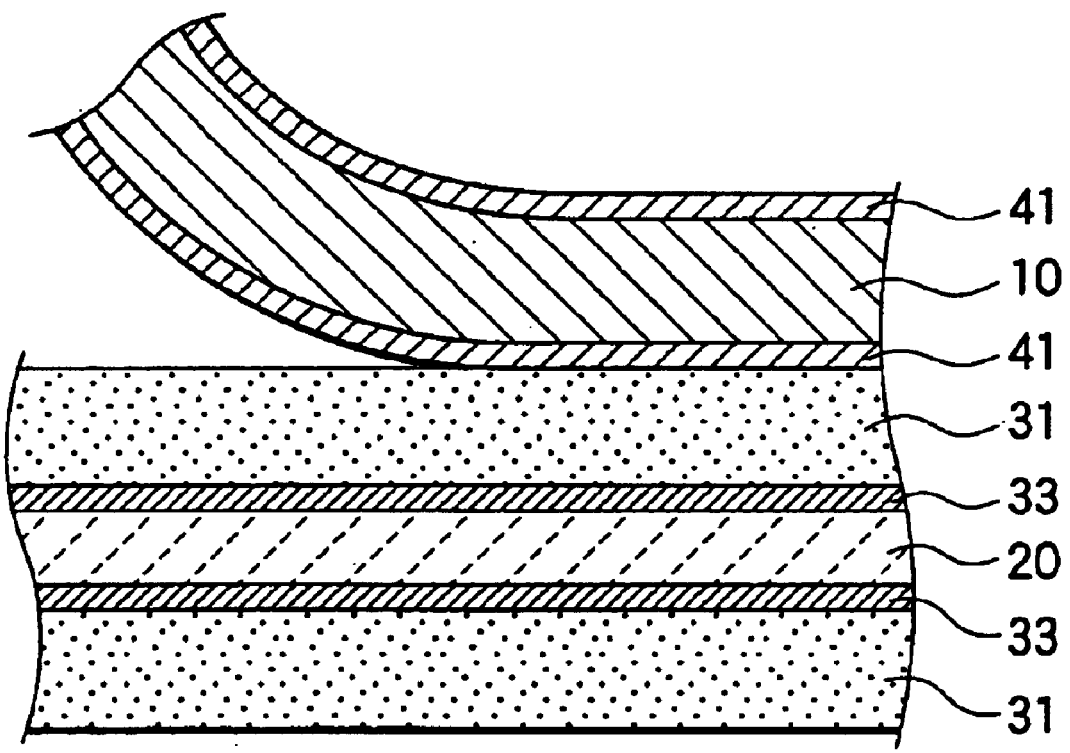
FIG. 5 is an enlarged view illustrating one embodiment of the present invention wherein the negative electrode and the positive electrode are bonded to each other.

Subsequently, as shown in FIG. 4, the same mixture as mentioned above was applied to both sides of the positive electrode 10. During this procedure, the spread amount of the mixture was adjusted such that the resin layer 41 formed on the positive electrode 10 had the same thickness as that of the resin layer 33 formed on the separator 31. Subsequently, as shown in FIG. 5, the negative electrode 20 having the separator 31 bonded to both sides thereof and the positive electrode 10 having the resin layer 41 formed on both sides thereof were laminated and bonded to each other. The end of the current collector 11 of the positive electrode 10 is not coated with the positive composite 12, and a leaf of aluminum lead 64 is ultrasonically welded thereto (see FIG. 6). The end of the current collector 21 of the negative electrode 20 has a region which is not coated with the negative composite 22, and a leaf of lead 65 is ultrasonically welded thereto (see FIG. 6).

Figure 6:
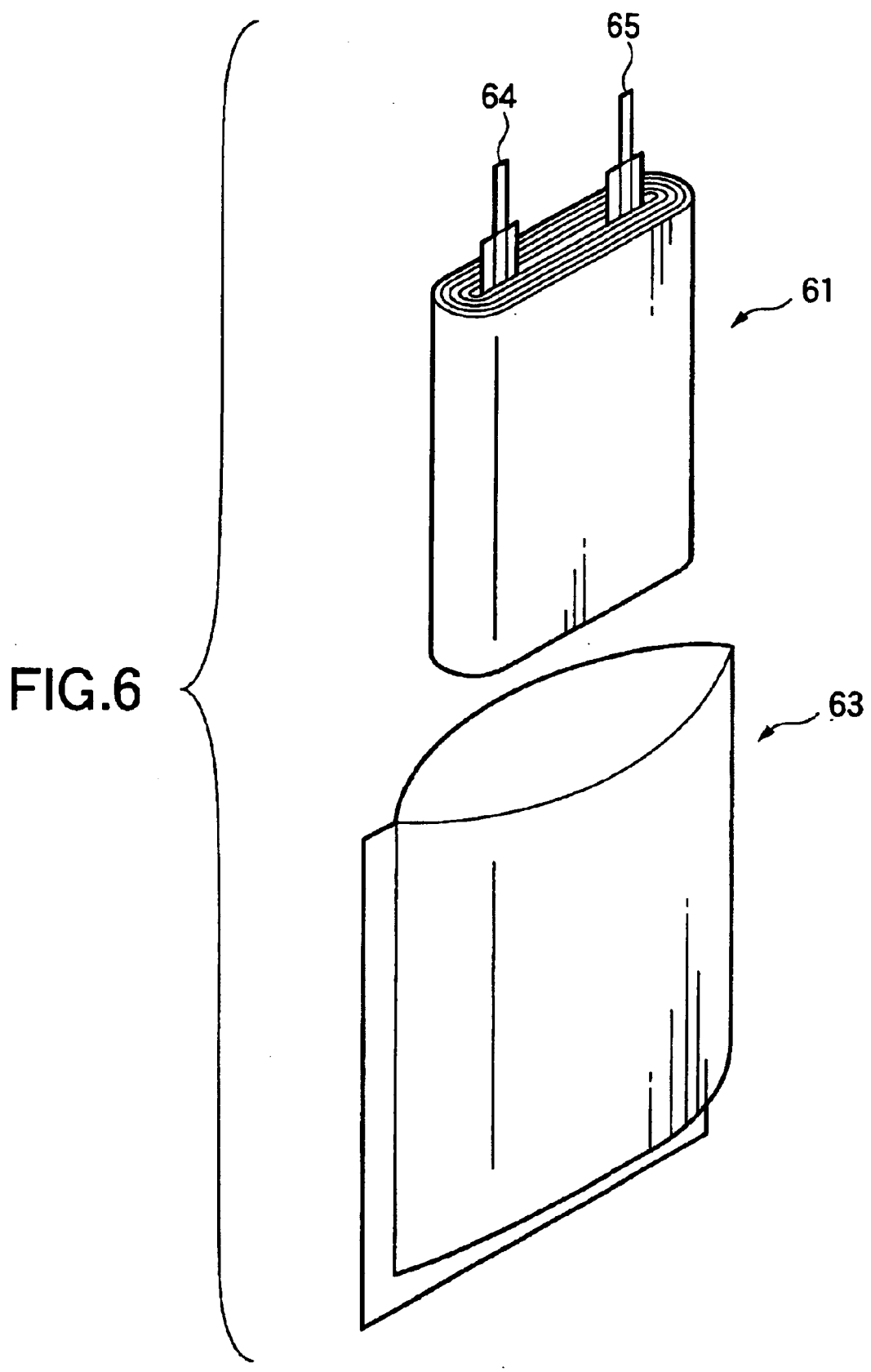
FIG. 6 is a perspective view of one embodiment of the electricity-storing element and the battery container of the present invention.

The electrodes were wound on a metallic core, and the core was then pulled out of the winding to produce an electricity-storing element 61. Subsequently, the electricity-storing element 61 was received in a bag-shaped container 63 made of a metal-resin laminate film as shown in FIG. 6. The container 63 is made of a metal-resin laminate film having a three-layer structure comprising a surface protective layer made of PET (poly(ethylene terephthalate)), a barrier layer made of aluminum and a weld layer made of PE (polyethylene). The metal-resin laminate film is folded with the weld layer inside, and then welded at the bottom and sides thereof to form a bag. Finally, the bag is welded at the upper opening thereof.

Figure 7:
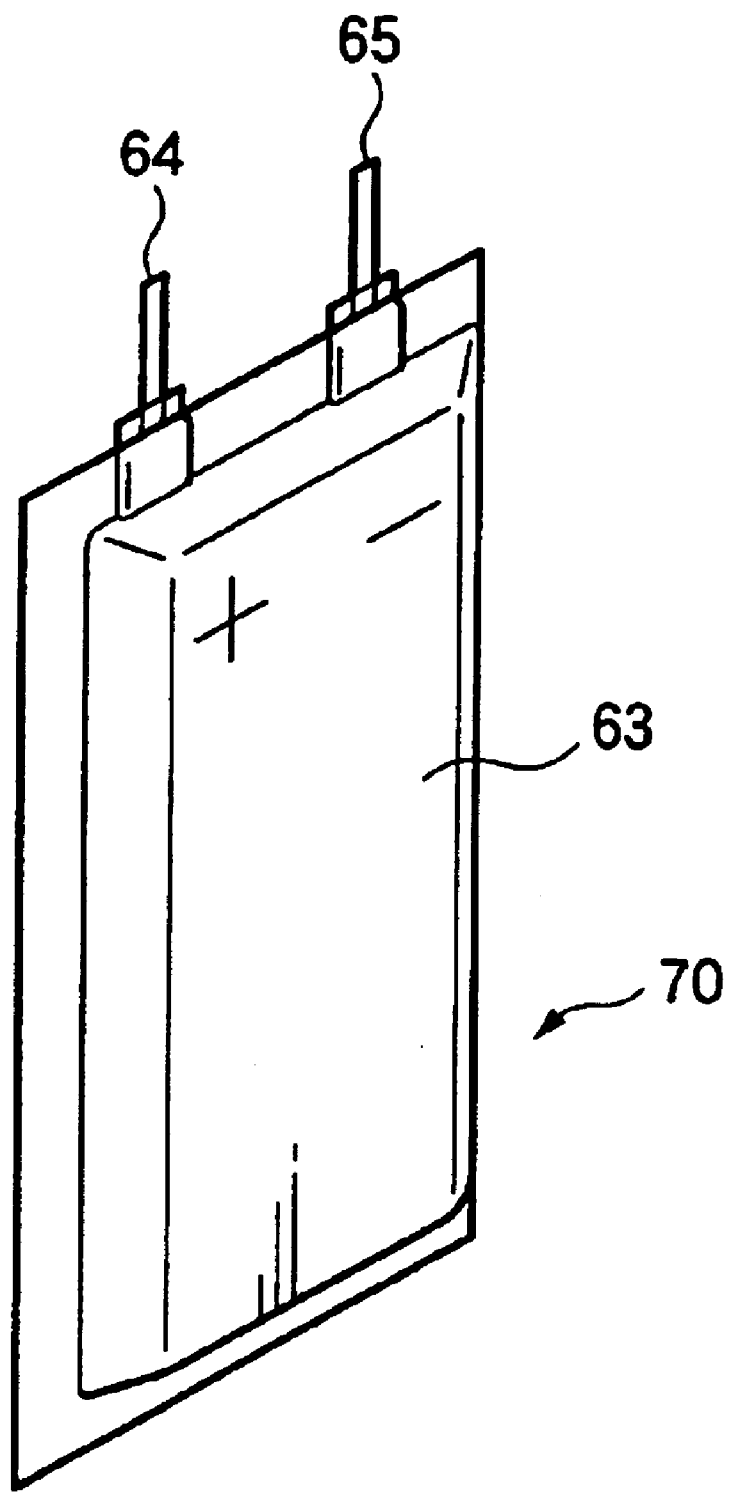
FIG. 7 is a perspective view of one embodiment of the battery of the present invention.

Subsequently, an electrolyte was injected into the container 63 which had the electricity-storing element 61 received therein. The electrolyte is a 1:1 (by volume) mixture of ethylene carbonate and diethyl carbonate containing 1 mol/l of $LiPF_6$. Thus, a 650 mAh lithium ion battery 70 having an average discharge voltage of 3.7 V and a size of 3.8 mm (thickness)×35 mm (width)×62 mm (length) was obtained (see FIG. 7).

Batteries of Examples 1 to 6 were prepared from different combinations of the thickness D of separator and the thickness J of resin layer as set forth in Table 1. As Comparative Example 1, a battery free of resin layer was prepared. As Comparative Example 2, a battery comprising a resin layer but free of alumina powder therein was prepared. The batteries of Examples 1 to 6 and Comparative Examples 1 and 2 were each subjected to charge and discharge cycles, and then measured for the capacity change. The results are set forth in Table 1. Referring to the charge and discharge cycle conditions, one cycle consists of 3 hours of charging at a constant voltage of 4.2 V and discharging to 2.75 V with a constant current of 1 CA (650 mA). The capacity in Table 1 is represented relative to the discharge capacity of 650 mA of the battery of Example 3 which has been charged for the first time as 100.

As can be seen in Table 1, all the batteries of Examples 1 to 6 exhibited a high initial capacity and maintained a high capacity even after 200 cycles. The batteries of Examples 1 to 4 and Example 6 still maintained a high capacity after 300 cycles.

On the contrary, the battery of Comparative Example 1, which is free of resin layer, showed an initial capacity but showed a capacity drop every repetition of charge and discharge cycle and then showed an extremely low capacity after 200 cycles. Thus, the batteries of Examples 1 to 6 have electrodes and a separator bonded to each other with a porous resin layer and can keep the distance between the electrodes constant even if the battery container is so flexible that the pressure from the battery container is not sufficient. These batteries were confirmed to undergo no capacity drop even after repeated charge and discharge and exhibit a prolonged life.

The battery of Comparative Example 2, which comprises no alumina powder incorporated in the resin layer, exhibited an extremely low initial capacity.

Figure 8:
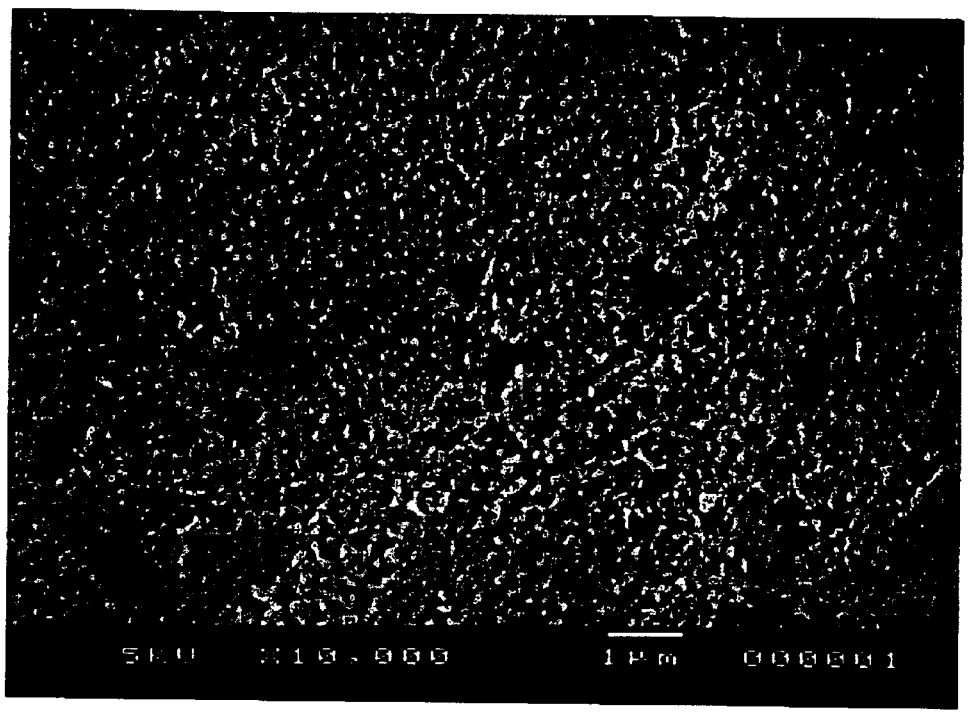
FIG. 8 is an electron microphotograph of the resin layer of Example 1.

Subsequently, the resin layer 41 formed between the positive electrode 10 and the separator 31 and the resin layer 33 formed between the negative electrode 20 and the separator 31 in the battery of Example 1 were observed under electron microscope. FIG. 8 illustrates an electron microphotograph of the resin layer 41 formed between the positive electrode 10 and the separator 31. The resin layer was confirmed porous as shown in FIG. 8. Though not shown, the resin layer 33 formed between the negative electrode 20 and the separator 31 was similarly confirmed porous.

Figure 9:
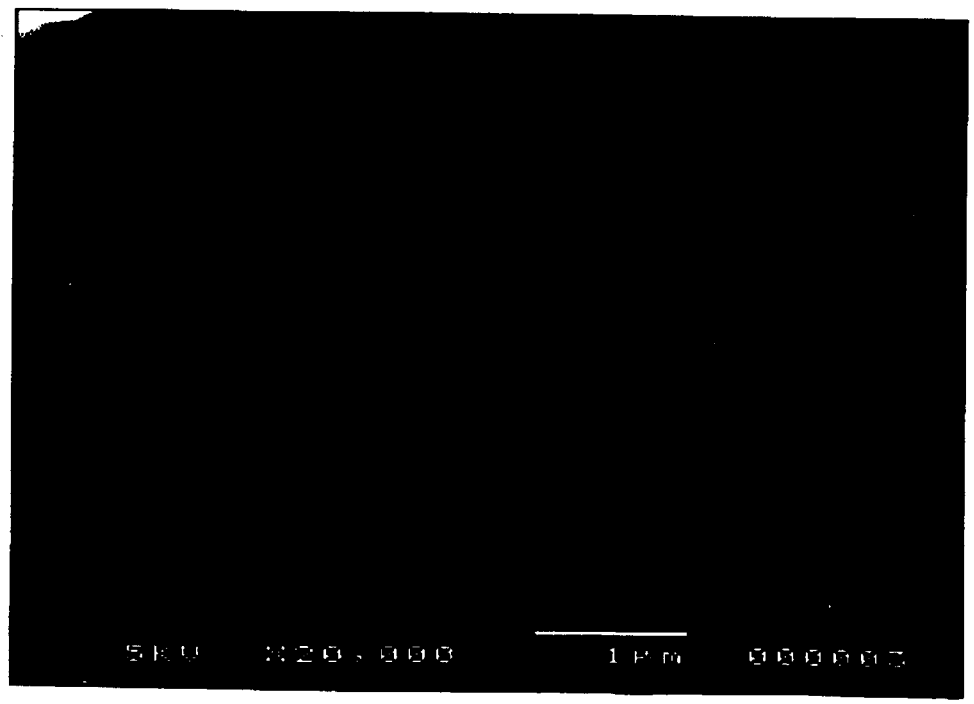
FIG. 9 is an electron microphotograph of the resin layer of Comparative Example 2.

FIG. 9 illustrates an electron microphotograph of the resin layer free of alumina powder formed in the battery of Comparative Example 2. The resin layer in the battery of Comparative Example 2 was confirmed non-porous. It was thus confirmed that a resin layer filled with an alumina powder as a solid filler is rendered porous. Accordingly, it was confirmed that the batteries of Examples 1 to 6 exhibit a higher energy density than the battery of Comparative Example 2 and a high initial capacity.

The effect of the average particle diameter of solid filler on the initial capacity was then studied. In this test, batteries having the same structure as that of Example 1 except that the average particle diameter of the alumina powder were varied were prepared (see Table 2). In other words, the thickness of the separator was 20 μm and the thickness of the resin layer was 1.5 μm.

These batteries were each subjected to charge and discharge cycle, and then measured for initial capacity. The results are set forth in Table 2. Referring to the charge and discharging cycle conditions, one cycle consists of 3 hours of charging at a constant voltage of 4.2 V and discharging to 2.75 V with a constant current of 1 CA (650 mA). In Table 2, the initial capacity is represented relative to that of the

TABLE 1

|  | Example 1 | Example 2 | Example 3 | Example 4 | Example 5 | Example 6 | Comparative Example 1 | Comparative Example 2 |
|---|---|---|---|---|---|---|---|---|
| Thickness D of separator (μm) | 20 | 20 | 20 | 15 | 20 | 20 | 25 | 20 |
| Thickness J of resin layer (μm) | 1.5 | 1.0 | 3.0 | 5.0 | 0.5 | 7.0 | 0.0 | 1.5 |
| Kind of solid filler | Alumina | Alumina | Alumina | Alumina | Alumina | Alumina | — | — |
| Capacity at 1st cycle (%) | 101.8 | 102.7 | 100.0 | 100.0 | 103.9 | 85.5 | 100.0 | 42.5 |
| Capacity at 100th cycle (%) | 96.9 | 97.1 | 94.3 | 94.5 | 82.7 | 77.0 | 77.0 | — |
| Capacity at 200th cycle (%) | 93.2 | 92.5 | 90.0 | 91.8 | 69.0 | 72.5 | 32.2 | — |
| Capacity at 300th cycle (%) | 91.1 | 90.4 | 84.7 | 88.8 | — | 69.0 | — | — | battery of Comparative Example 1 as 100, and the electrical resistance is represented relative to that of the battery of Comparative Example 1 as 100.

Figure 10:
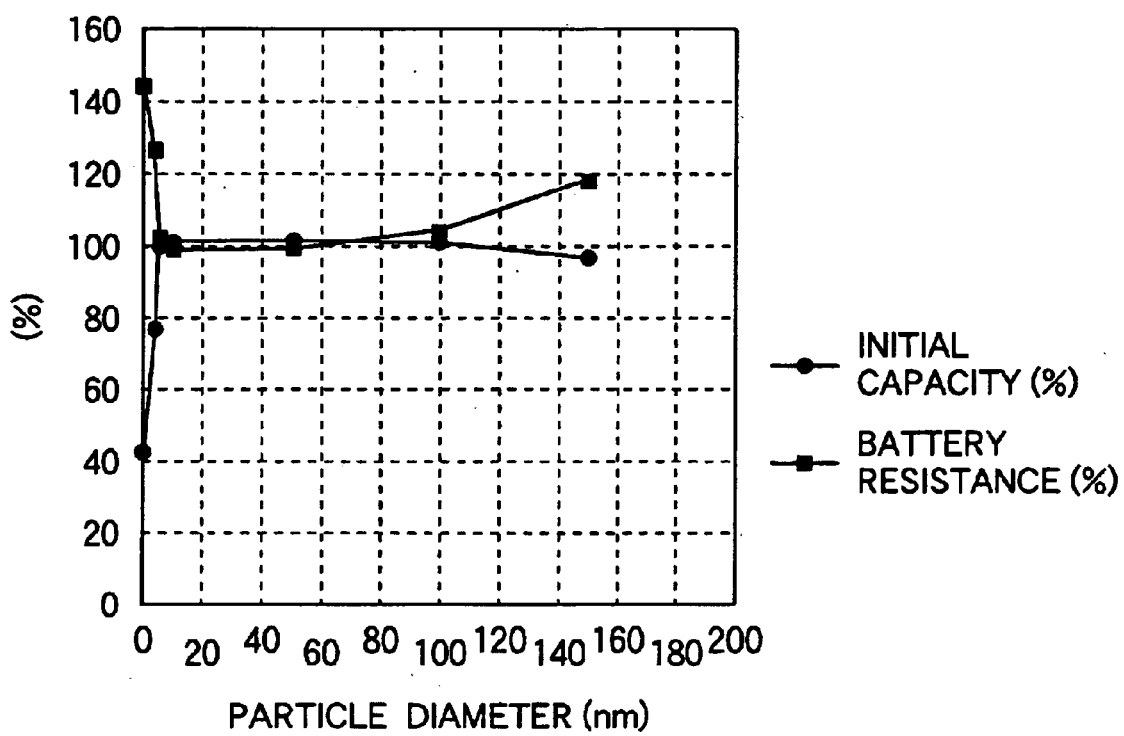
FIG. 10 is a graph illustrating the relationship between the particle diameter and the initial capacity and battery resistance.

As shown in Table 2 and FIG. 10, the batteries comprising an alumina powder having an average particle diameter of from 5 to 100 nm exhibit a higher initial capacity and a lower resistance than that of Comparative Example 1 which is free of resin layer.

TABLE 2

| Average particle diameter (nm) | Initial capacity (%) | Battery resistance (%) |
| --- | --- | --- |
| 0 | 42.5 | 145 |
| 3 | 77.3 | 127 |
| 5 | 100.3 | 103 |
| 10 | 101.8 | 100 |
| 50 | 102.0 | 100 |
| 100 | 101.3 | 105 |
| 150 | 97.0 | 118 |

The effects of the specific surface area of the solid filler on the initial capacity and cycle life performance were then studied. In this test, batteries having the same structure as that of Example 1 except that the specific surface area of alumina powder was varied were prepared (see Table 3). In other words, the thickness of the separator was 20 µm and the thickness of the resin layer was 1.5 µm.

These batteries were each subjected to charge and discharge cycles, and then measured for initial capacity and capacity after 100 cycles. The results are set forth in Table 3. Referring to the charge and discharge cycle conditions, one cycle consists of 3 hours of charging at a constant voltage of 4.2 V and discharging to 2.75 V with a constant current of 1 CA (650 mA). In Table 3, the initial capacity and capacity after 100 cycles are represented relative to that of the battery of Comparative Example 1 as 100, and the electrical resistance is represented relative to that of the battery of Comparative Example 1 as 100.

Figure 11:
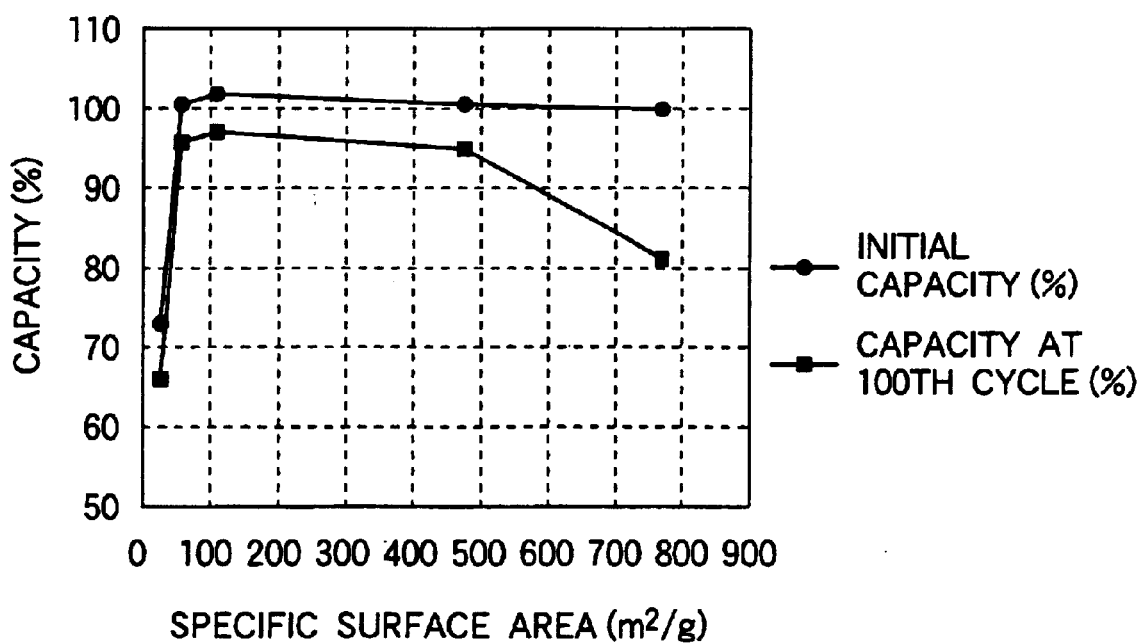
FIG. 11 is a graph illustrating the relationship between the specific surface area and the capacity.

As shown in Table 3 and FIG. 11, the batteries comprising an alumina powder having a specific surface area of from not smaller than 50 m$^2$/g to not greater than 500 m$^2$/g exhibit a higher initial capacity and a longer life than that of Comparative Example 1 which is free of resin layer.

TABLE 3

| Specific surface area (m$^2$/g) | Initial capacity (%) | Capacity at 100th cycle (%) |
| --- | --- | --- |
| 28 | 72.9 | 66.2 |
| 55 | 100.8 | 95.8 |
| 108 | 101.8 | 96.9 |
| 480 | 100.9 | 94.8 |
| 770 | 100.2 | 81.2 |

Industrial Applicability

As mentioned above, the present invention can provide a battery having a high energy density and an excellent cycle life performance, even when the electricity-storing element is received in a case made of a flexible material.

What is claimed is:

1. A battery comprising a positive electrode, a negative electrode and a separator provided interposed therebetween, wherein at least one surface of said separator is bonded to said positive electrode or negative electrode via a porous resin layer comprising a solid filler, wherein said solid filler comprises a ceramic powder comprising primary particles having an average diameter of from 5 nm to 100 nm and the specific surface area of said solid filler is from not smaller than 50 m$^2$/g to not greater than 500 m$^2$/g.

2. The battery as defined in claim 1, wherein the thickness of said resin layer is from 1 µm to 10 µm.

3. The battery as defined in claim 1 or 2, wherein the thickness of said separator is not greater than 25 µm.

4. The battery as defined in claim 2, wherein the thickness of said separator is not greater than 25 µm, and said resin layer comprises at least one member selected from the group consisting of polyethylene, polypropylene, poly(vinylidene chloride), poly(vinylidene fluoride), polyethylene oxide and polyacrylonitrile.

5. The battery as defined in claim 2, wherein the thickness of said separator is not greater than 25 µm, and said resin layer comprises at least one member selected from the group consisting of copolymer of vinylidene fluoride and hexafluoropropylene, copolymer of vinylidene fluoride and chlorotrifluoroethylene, copolymer of vinylidene fluoride, hexafluoropropylene and tetrafluoroethylene, copolymer of vinylidene fluoride and tetrafluoroethylene and copolymer of hexafluoropropylene and tetrafluoroethylene.

6. The battery as defined in claim 1, wherein said ceramic powder comprises at least one member selected from the group consisting of alumina, silica, titania and zirconia.

7. The battery as defined in claims 1, 2, 4, 5 or 6, wherein said positive electrode, said negative electrode, said separator and said resin layer are at least partly impregnated with a non-aqueous electrolyte.

8. The battery as defined in claims 1, 2, 4, 5 or 6, wherein a part of said resin layer penetrates into the surface layer of said positive electrode and, said negative electrode.

9. The battery as defined in claims 1, 2, 4, 5 or 6, wherein said positive electrode, said negative electrode and said separator are received in a flexible material case.

10. The battery as defined in claim 3, wherein said positive electrode, said negative electrode, said separator and said resin layer are at least partly impregnated with a non-aqueous electrolyte.

11. The battery as defined in claim 3, wherein a part of said resin layer penetrates into the face layer of said positive electrode and said negative electrode.

12. The battery as defined in claim 3, wherein said positive electrode, said negative electrode and said separator are received in a flexible material case.

* * * * *